(12) United States Patent
Cox

(10) Patent No.: US 9,846,064 B2
(45) Date of Patent: Dec. 19, 2017

(54) SENSOR APPARATUS, CORRESPONDING TURBOCHARGER AND METHOD OF MEASURING A MASS FLOW RATE

(71) Applicant: Cummins Ltd, Huddersfield (GB)

(72) Inventor: Calvin Howard Cox, Mirfield (GB)

(73) Assignee: Cummins Ltd., Huddersfield (GB)

( * ) Notice: Subject to any disclaimer, the term of this patent is extended or adjusted under 35 U.S.C. 154(b) by 202 days.

(21) Appl. No.: 14/423,164

(22) PCT Filed: Aug. 23, 2013

(86) PCT No.: PCT/GB2013/052227
§ 371 (c)(1),
(2) Date: Feb. 23, 2015

(87) PCT Pub. No.: WO2014/030011
PCT Pub. Date: Feb. 27, 2014

(65) Prior Publication Data
US 2015/0369642 A1     Dec. 24, 2015

(30) Foreign Application Priority Data

Aug. 24, 2012  (GB) .................................. 1215143.7

(51) Int. Cl.
*G01F 1/40* (2006.01)
*F01D 17/02* (2006.01)
(Continued)

(52) U.S. Cl.
CPC .............. *G01F 1/40* (2013.01); *F01D 17/02* (2013.01); *F02C 6/12* (2013.01); *G01F 1/38* (2013.01);
(Continued)

(58) Field of Classification Search
USPC ..................................................... 73/112.05
See application file for complete search history.

(56) References Cited

U.S. PATENT DOCUMENTS

| 4,420,972 A | 12/1983 | Kuroiwa et al. |
| 5,913,239 A | 6/1999 | Morris, Jr. et al. |

(Continued)

FOREIGN PATENT DOCUMENTS

| CN | 101397956 A | 4/2009 |
| CN | 101415924 A | 4/2009 |

(Continued)

OTHER PUBLICATIONS

Examination Report (in Chinese language), dated Dec. 23, 2015, issued by the State Intellectual Property Office of the People's Republic of China (contains summary of report translated in English language) for related Application No. 201380055898.6; 12 pages.

(Continued)

*Primary Examiner* — Laura Martin
*Assistant Examiner* — Jean Morello
(74) *Attorney, Agent, or Firm* — Faegre Baker Daniels LLP

(57) ABSTRACT

A sensor apparatus comprising a housing having an inner perimeter which defines an area through which gas may flow, the housing being provided with a first chamber which extends around the area through which gas may flow, an entrance being distributed around the first chamber, and a second chamber which extends around the area through which gas may flow, an exit being distributed around the second chamber, the first chamber being arranged to be upstream of the second chamber in use, wherein the sensor apparatus further comprises one or more sensors arranged to measure a pressure difference between pressure in the first chamber and pressure in the second chamber. Corresponding turbocharger and method of measuring a mass flow rate are also provided.

28 Claims, 8 Drawing Sheets

(51) Int. Cl.
*F02C 6/12* (2006.01)
*G01F 1/38* (2006.01)
*G01M 15/14* (2006.01)
*F01D 17/08* (2006.01)
*F02C 7/04* (2006.01)

(52) U.S. Cl.
CPC ............ *G01M 15/14* (2013.01); *F01D 17/08* (2013.01); *F02C 7/04* (2013.01); *F05D 2220/40* (2013.01); *F05D 2240/40* (2013.01); *F05D 2260/83* (2013.01); *F05D 2270/3015* (2013.01); *F05D 2270/3061* (2013.01)

(56) References Cited

U.S. PATENT DOCUMENTS

| | | | |
|---|---|---|---|
| 6,915,705 B1* | 7/2005 | Truitt | A61B 5/087 73/861.52 |
| 2004/0173030 A1* | 9/2004 | Harman | G01F 1/46 73/861.65 |
| 2005/0279100 A1* | 12/2005 | Graziosi | F01D 5/145 60/772 |
| 2010/0011869 A1* | 1/2010 | Klosinski | G01F 1/42 73/700 |
| 2010/0089168 A1 | 4/2010 | Schnabel et al. | |
| 2013/0145820 A1* | 6/2013 | Boahene | F01N 13/008 73/23.31 |

FOREIGN PATENT DOCUMENTS

| | | |
|---|---|---|
| DE | 2405786 A1 | 8/1975 |
| EP | 0708246 A2 | 4/1996 |
| GB | 2326484 A | 12/1998 |
| JP | S5984115 A | 5/1984 |
| WO | WO 2005/068842 A1 | 7/2005 |

OTHER PUBLICATIONS

Search Report issued by the Intellectual Property Office United Kingdom, dated Dec. 4, 2012, for corresponding German Application No. 1215143.7; 3 pages.
Oudheusden van B.W., "Silicon Flow Sensors", IEE Proceedings, vol. 135, Pt. D, No. 5, Sep. 1988, pp. 373-380.
Oudheusden van B.W., "Silicon Thermal Flow Sensors", Sensors and Actuators A, Elsevier Sequoia, vol. 30, No. 1-2, Jan. 1, 1992, pp. 5-26.

* cited by examiner

SENSOR APPARATUS, CORRESPONDING TURBOCHARGER AND METHOD OF MEASURING A MASS FLOW RATE

CROSS-REFERENCE TO RELATED APPLICATION

The present application is a National Stage of International Application No. PCT/GB2013/052227, filed Aug. 23, 2013, which claims priority to GB 1215143.7, filed Aug. 24, 2012, the entire disclosures of which are hereby expressly incorporated herein by reference.

FIELD OF THE DISCLOSURE

The present invention relates to a sensor apparatus and to a turbocharger.

BACKGROUND

Turbochargers are well known devices for supplying air to the intake of an internal combustion engine at pressures above atmospheric (boost) pressure. A conventional turbocharger typically comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

It may be desirable to measure the mass flow rate of air flowing through an inlet of a compressor.

SUMMARY

According to a first aspect of the invention, there is provided a sensor apparatus comprising a housing having an inner perimeter which defines an area through which gas may flow, the housing being provided with a first chamber which extends around the area through which gas may flow, an entrance being distributed around the first chamber, and a second chamber which extends around the area through which gas may flow, an exit being distributed around the second chamber, the first chamber being arranged to be upstream of the second chamber in use, wherein the sensor apparatus further comprises one or more sensors arranged to measure a pressure difference between pressure in the first chamber and pressure in the second chamber.

The first chamber may have a cross-sectional area which is sufficiently large that in use the pressure of gas within the first chamber substantially equalizes during operation of the sensor. The entrance to the first chamber may be narrower in the vicinity of the sensor and wider further away from the sensor.

The entrance may extend intermittently around the first chamber. Open portions of the entrance may occupy a smaller proportion of the entrance in the vicinity of the sensor than open portions of the entrance further away from the sensor.

The second chamber may have a cross-sectional area which is sufficiently large that in use the pressure of gas within the second chamber substantially equalizes during operation of the sensor.

The exit from the second chamber may be narrower in the vicinity of the sensor and wider further away from the sensor.

The exit may extend intermittently around the second chamber. Open portions of the exit may occupy a smaller proportion of the exit in the vicinity of the sensor than open portions of the exit further away from the sensor.

The sensor apparatus may further comprise a sensing channel which is connected between the first chamber and the second chamber such that gas flows through the sensing channel in use, and wherein the one or more sensors are located in the sensing channel.

The first chamber may be shaped such that there is no direct flow path between the entrance of the first chamber and the sensing channel.

The one or more sensors may comprise a sensing device which is at least partially located within the sensing channel.

The sensing device may be at least partially located within a flow restrictor which is provided in the sensing channel.

The sensing device may comprise two bipolar transistors, one of the bipolar transistors being electrically heated.

The sensing device may further comprise a circuit configured to provide substantially constant power to the heated bipolar transistor and to measure a difference between base emitter voltages of the bipolar transistors.

The sensing device may further comprise a circuit configured to maintain a substantially constant temperature difference between the bipolar transistors, and to measure the power used to heat the heated transistor.

The circuit may be further configured to measure the temperature of the bipolar transistor which is not electrically heated.

The flow restrictor may be not formed integrally with other parts of the sensing apparatus.

The flow restrictor may be formed from a material which is different to the material used to form the housing of the sensor apparatus.

The one or more sensors may comprise a strain gauge which is connected between the first chamber and the second chamber. The first and second chambers may be configured such that there is no bleed of gas between them when a strain gauge is used.

The strain gauge may be provided in a sensing channel which is connected between the first chamber and the second chamber.

The sensor apparatus may further comprise an additional chamber located between the first and second chambers, the additional chamber being connected to the first chamber or to the second chamber, an additional sensor being located within the additional chamber. The additional chamber may be configured to shelter the additional sensor from the effects of airflow. The additional sensor may be an ambient air temperature sensor.

The first chamber and the second chamber may be not connected, and the one or more sensors may comprise a pressure sensor located in the first chamber and a pressure sensor located in the second chamber.

According to a second aspect of the invention there is provided a turbocharger comprising a turbine connected via a shaft to a compressor, wherein the sensor apparatus of the first aspect of the invention is provided in an inlet of the compressor.

According to a third aspect of the invention there is provided a method of measuring the mass flow rate of a gas using a sensor apparatus comprising a housing having an inner perimeter which defines an area through which the gas may flow, the method comprising receiving gas in a first chamber which extends around the area through which gas may flow, an entrance being distributed around the first chamber, receiving downstream gas in a second chamber which extends around the area through which gas may flow, an exit being distributed around the second chamber, and using one or more sensors to measure a pressure difference between pressure in the first chamber and pressure in the second chamber.

The gas may be flowing into a compressor of a turbocharger.

BRIEF DESCRIPTION OF THE DRAWINGS

Specific embodiments of the present invention will now be described, by way of example only, with reference to the accompanying Figures, in which.

DETAILED DESCRIPTION OF EMBODIMENTS OF THE DISCLOSURE

Figure 1:
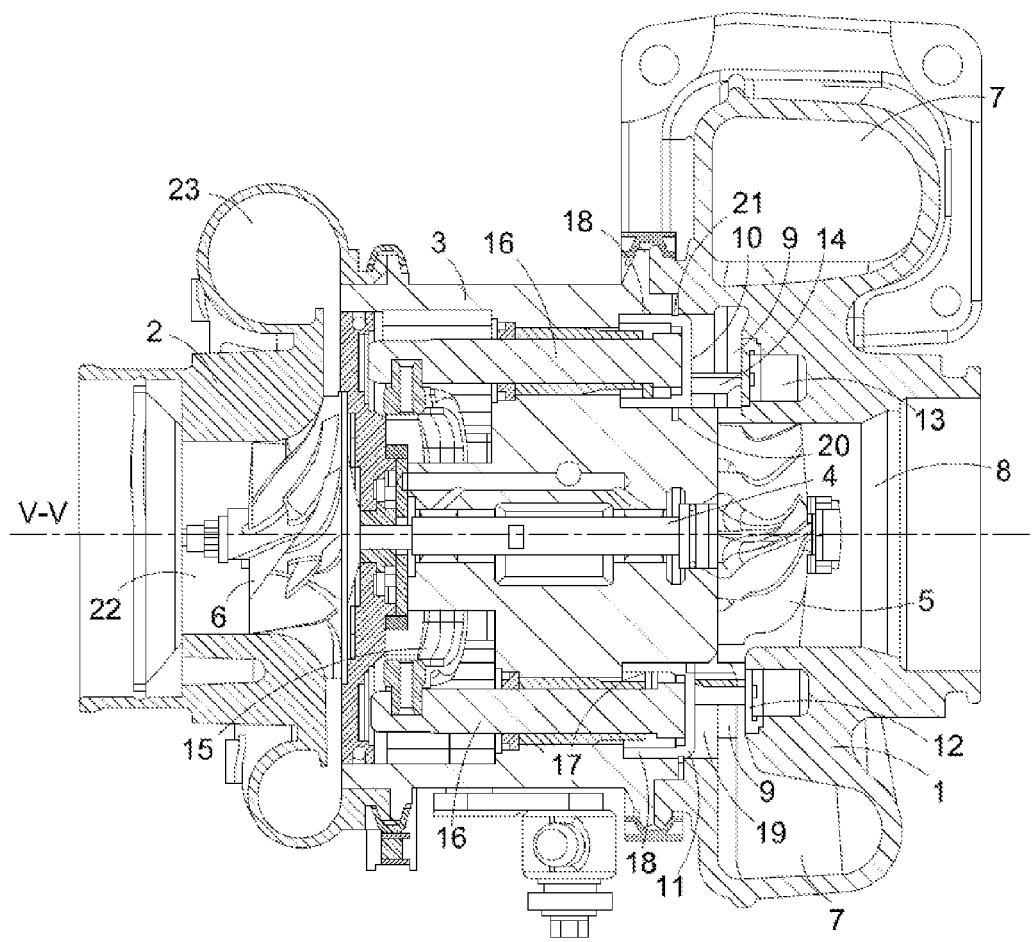
FIG. 1 schematically depicts an axial cross-section through a variable geometry turbocharger.

FIG. 1 illustrates a variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis V-V on bearing assemblies located in the bearing housing 3.

The turbine housing 1 defines an inlet volute 7 to which gas from an internal combustion engine (not shown) is delivered, for example via one or more conduits (not shown). The exhaust gas flows from the inlet chamber 7 to an axial outlet passageway 8 via an annular inlet passageway 9 and turbine wheel 5. The inlet passageway 9 is defined on one side by the face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12 into the recess 13. In another embodiment (not shown), the wall of the inlet passageway may be provided with the vanes, and the nozzle ring 11 provided with the recess and shroud.

The position of the nozzle ring 11 is controlled by an actuator assembly, for example an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending moveable rods 16 that support the nozzle ring 11. Accordingly, by appropriate control of the actuator (which control may for instance be pneumatic, hydraulic, or electric), the axial position of the rods 16 and thus of the nozzle ring 11 can be controlled. The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet chamber 7 to the outlet passageway 8 passes over the turbine wheel 5 and as a result torque is applied to the shaft 4 to drive the compressor wheel 6. Rotation of the compressor wheel 6 within the compressor housing 2 pressurizes air present in an air inlet 22 and delivers the pressurized air to an air outlet volute 23 from which it is fed to an internal combustion engine (not shown), for example via one or more conduits (not shown).

Figure 2:
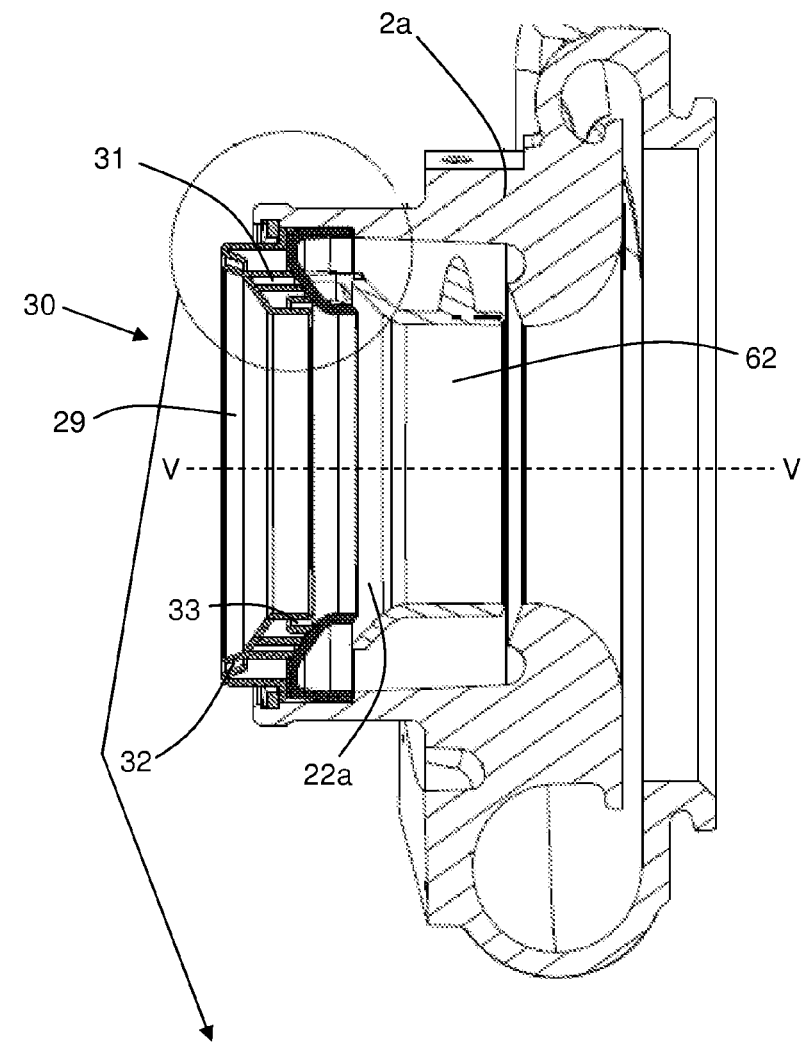
FIG. 2 schematically depicts a compressor inlet of a turbocharger which includes a sensor apparatus according to an embodiment of the invention.
Figure 2:
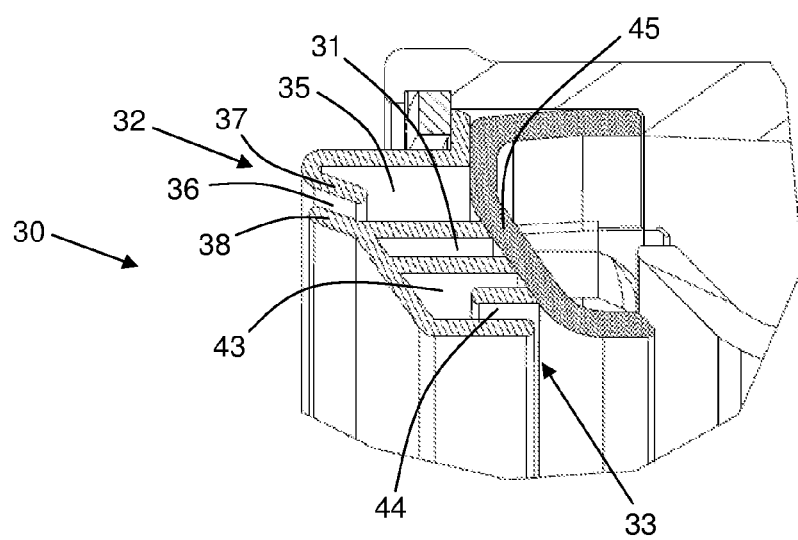

An upper portion of FIG. 2 schematically depicts a modified cross-section through a compressor housing 2a which has a similar construction to the compressor housing 2 of the turbocharger shown in FIG. 1. A sensor apparatus 30 according to an embodiment of the invention is provided at an air inlet 22a of the compressor housing 2a. The sensor apparatus 30 comprises an annular housing 29 containing a sensing channel 31, an inlet 32 and an outlet 33. The annular housing 29 has an inner perimeter which defines an area through which air may flow into the compressor. Also shown in FIG. 2 is a wall structure 62 which is also in the air inlet 22a of the compressor housing 2a. The wall structure may be connected to the sensor apparatus 30. A lower portion of FIG. 2 is an enlarged view of an encircled part of the upper portion of FIG. 2. Referring to the lower portion of FIG. 2, the inlet 32 comprises an annular chamber 35 (which may be referred to as a first chamber or inlet chamber) to which an entrance 36 is connected. The entrance 36 is defined by walls 37, 38 which extend at a non-zero angle relative to a central axis V-V of the turbocharger. The entrance 36 is annular and extends around the inlet chamber 35. Consequently, the inlet chamber 35 receives air from around the circumference of the sensor apparatus 30. The entrance 36 may for example be a slit, an opening, a plurality of slits or a plurality of openings. The entrance 36 may extend continuously or substantially continuously around the inlet chamber 35. The entrance 36 may extend intermittently around the inlet chamber 35. The entrance 36 may be distributed around the inlet chamber 35.

The outlet 33 of the sensor apparatus 30 comprises an annular chamber 43 (which may be referred to as a second chamber or outlet chamber) to which an exit 44 is connected. The exit 44 extends around the outlet chamber 43, and thus allows air to leave the outlet chamber 43 from around an inner perimeter of the sensor apparatus 30. The exit 44 may for example be a slit, an opening, a plurality of slits or a plurality of openings. The exit 44 may extend continuously or substantially continuously around the outlet chamber 43. The exit 44 may extend intermittently around the outlet chamber 43. The exit 44 may be distributed around the outlet chamber 43.

An annular bracket 45 which is connected to an interior wall of the compressor housing 2a supports the sensor apparatus 30. The annular bracket 45 may form a wall of one or more of the inlet chamber 35, outlet chamber 43, and sensing channel 31 (e.g. as shown). Alternatively, the annular bracket may merely support the sensor apparatus 30 and not form part of a wall of the sensor apparatus.

Figure 3:
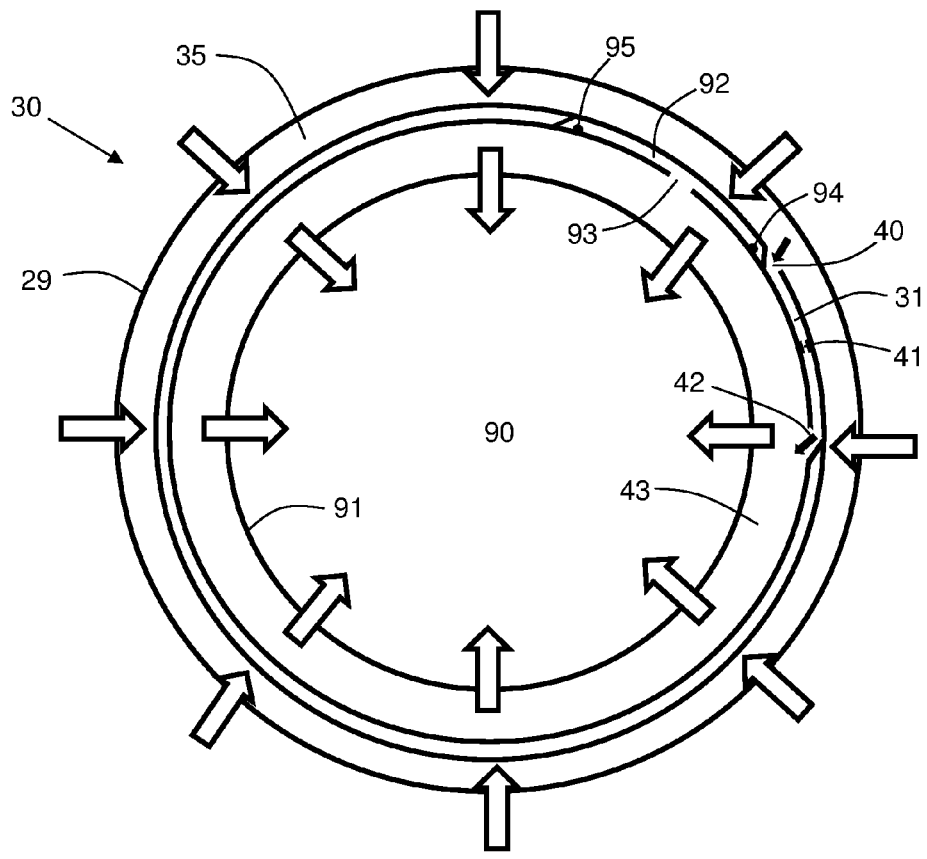
FIG. 3 schematically depicts the sensor apparatus in transverse cross-section.

FIG. 3 is a schematic cross-section of the sensor apparatus 30 viewed from one end. The inlet chamber 35 receives air from around the circumference of the sensor apparatus 30, as is represented schematically by eight arrows distributed around FIG. 3 which point into the inlet chamber 35. The sensing channel 31 has an entrance 40 which opens into the inlet chamber 35. Thus, air passes from the inlet chamber 35 via the entrance 40 into the sensing channel 31 (as represented by a solid black arrow). The air in the sensing channel 31 passes a sensor 41 (described further below) which is provided in the sensing channel 31 and which may be used to measure mass air flow. The sensing channel 31 is provided with an exit 42 which opens into the outlet chamber 43 of the sensor apparatus 30. Air passes from the sensing channel 31 into the outlet chamber 43 via the exit 42 (as represented by a solid black arrow). Air may pass out of the outlet chamber 43 from around the inner perimeter of the sensor apparatus 30, as is represented schematically by eight arrows distributed around FIG. 3 which point out of the outlet chamber 43. The sensing channel 31 limits flow of air between the inlet chamber 35 and the outlet chamber 43 such that a pressure differential exists between them (i.e. pressure does not equalize between the inlet and outlet chambers 35, 43).

The sensor apparatus 30 may be configured such that less than 1/50th of the mass air flow passing into the compressor travels through the sensing channel 31. The sensor apparatus 30 may be configured such that less than 1/100th, less than 1/200th or as little as 1/400th of the mass air flow passing into the compressor travels through the sensing channel 31. The majority of the mass air flow passes through an area 90 defined by the inner perimeter 91 of the sensor apparatus 30. The inner perimeter 91 of the sensor apparatus 30 may for example have a diameter of around 60 mm. The inner perimeter 91 of the sensor apparatus 30 may for example define an area of around 3600 mm2 through which air may travel to the compressor. The sensing channel 31 occupies only a small fraction of the circumference of the sensor apparatus 30. Thus, space remains in which sensors arranged to measure properties other than mass air flow may be provided. For example, in FIG. 3 an additional chamber 92 is provided adjacent to the sensing channel 31. The additional chamber 92 is connected via an entrance 93 to the outlet chamber 43 but is not connected to the inlet chamber 35. As a result, there is no flow of air through the additional chamber 92. Consequently, there is little or no 'swirl' of air in the additional chamber 92 (the additional chamber 92 is sheltered from the effects of airflow). This is particularly the case at ends of the additional chamber 92 which are located away from the entrance 93. Air in the additional chamber 92 has the same pressure as air in the outlet chamber 43. A temperature sensor 94 (e.g. a thermistor) is provided adjacent to one end of the additional chamber 92. Since there is relatively little movement of air at the end of the additional chamber 92, the temperature sensor 94 provides a measurement of the air temperature which is substantially unaffected by the rate of flow of air through the compressor inlet (this may be considered to be a measurement of the ambient air temperature). An air density sensor 95 is also provided in the additional chamber 9, the air density sensor 95 being provided at an opposite end of the additional chamber 92 from the temperature sensor 94. There is relatively little movement of air at the end of the additional chamber 92, and therefore the measurement provided by the air density sensor 95 is substantially unaffected by the rate of flow of air through the compressor inlet. Any suitable sensor may be provided in the additional chamber 92. For example, a humidity sensor or a gas spectrometry sensor may be provided.

Although only one additional chamber 92 is shown in FIG. 3, two or more additional chambers 92 may be provided. The additional chamber(s) may be provided at any suitable location in the sensor apparatus 30.

Figure 4:
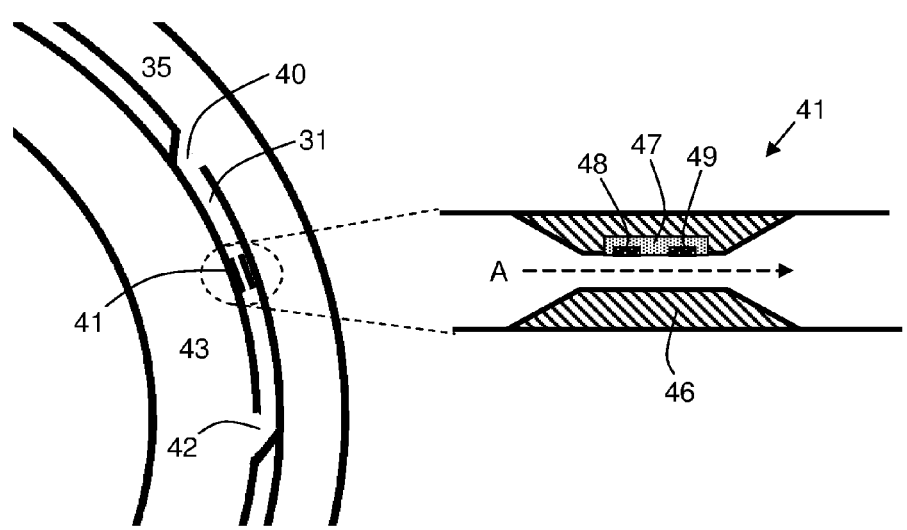
FIG. 4 schematically depicts part of the sensor apparatus in cross-section and a sensor which forms part of the sensor apparatus.

FIG. 4 schematically shows part of the sensor apparatus 30 of FIG. 3. In FIG. 4 the sensing channel 31, entrance 40 and exit 42 may all be seen. An enlarged cross-sectional view of the sensor 41 is shown to the right-hand side of FIG. 4. As may be seen, the sensor 41 comprises a flow restrictor 46, and a sensing device 47 being provided inside the flow restrictor 46. Because the pressure of air is higher at an input side of the sensor 41 (and in the inlet chamber 35) than the pressure at an output side of the sensor 41 (and the outlet chamber 43) air flows through the flow restrictor 46. The flow of air through the flow restrictor 46 is indicated schematically by dashed arrow A. The sensing device 47 measures the mass flow rate of air flowing through the flow restrictor 46. Although the illustrated flow restrictor 46 has a particular form, any suitable form of flow restrictor may be used. An orifice plate may be used as the flow restrictor.

The flow of air through the sensor 41 is determined by the difference in pressure on either side of the sensor 41 and by the diameter of the flow restrictor 46. The internal diameter of the flow restrictor 46 may be uniform (or substantially uniform) in order to ensure that pressure within the flow restrictor is equal throughout the length of the flow restrictor 46. The length of the flow restrictor 46 may have an insignificant effect upon the flow of air through the flow restrictor 46, provided that the flow restrictor 46 is relatively short. The flow restrictor 46 may for example have a length of around 1 cm or less.

The pressures on either side of the sensor 41 correspond respectively with the pressures in the inlet chamber 35 and the outlet chamber 43 (the sensing channel 31 may have a diameter which is sufficiently large that it does not significantly affect these pressures). The diameter and length of the flow restrictor 46 may be accurately controlled during manufacture of the flow restrictor 46. Thus, the mass flow rate of air measured by the sensor 41 may be used to provide an accurate determination of the mass flow rate of air travelling through the compressor inlet 22a (see FIG. 2).

The flow restrictor 46 acts as a Venturi. The mass flow rate of air through the flow restrictor 46 is proportional to the difference in pressure at the input and output sides of the flow restrictor 46. Therefore, by measuring the mass flow rate of air through the flow restrictor 46, a measurement of the pressure differential is effectively being performed. The pressure differential in the inlet and outlet chambers 35, 43 is itself determined by the mass flow rate of air passing through the compressor inlet 22a. Consequently, the mass flow rate measured by the sensing device 47 provides an indication of the mass flow rate of air passing through the compressor inlet 22a. The mass flow rate of air passing through the sensor 41 may be directly proportional to the mass flow rate of air passing through the compressor inlet 22a. Alternatively, some other relationship may exist between the mass flow rates of air in the sensor 41 and air passing through the compressor inlet. A microprocessor or other control apparatus (not shown) may store information regarding the relationship between the mass flow rates of air through the sensor 41 and air passing through the compressor inlet, thereby allowing a measurement performed using the sensor 41 to be converted to a mass flow rate of air passing through the compressor inlet.

The sensing device 47 may for example comprise transistors 48, 49 which are connected to a circuit that measures their temperatures (the circuit is described further below). The measured temperatures of the transistors 48, 49 may be used to determine the mass flow rate of air flowing through the flow restrictor 46.

Figure 6:
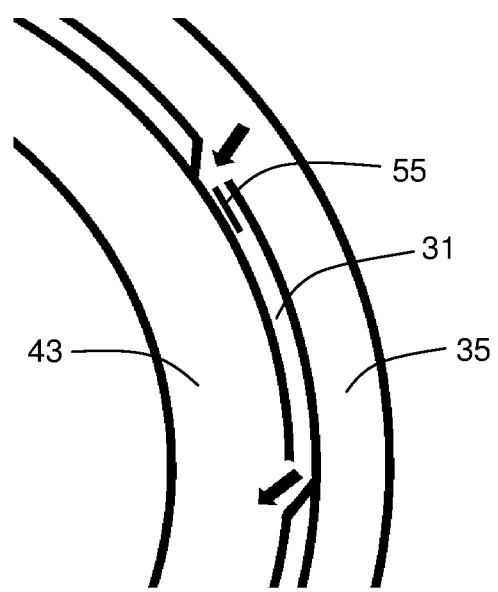
FIG. 6 schematically depicts part of the sensor apparatus in cross-section.

The flow restrictor 46 may, for example, dampen pressure within the inlet and outlet chambers 35, 43. This damping may improve equalization of pressure within the inlet chamber 35, and similarly improve equalization of pressure within the outlet chamber 43. This may improve the accuracy of the air mass flow rate measured by the sensor 41. Similarly, because the flow of air through the sensor 41 is restricted by the flow restrictor 46, the entrance 36 (see FIG. 6) of the inlet chamber 35 may be widened to cover a greater intake area without giving rise to increased turbulence at the entrance (the flow restrictor 46 limits the inflow of air). This may improve equalization of pressure in the inlet chamber 35 with pressure in the compressor inlet. Similarly, widening the exit 44 of the outlet chamber 43 may improve equalization of pressure in the outlet chamber 43 with pressure in the compressor inlet. Finally, the flow restrictor 46, because it is not formed integrally with other parts of the sensor apparatus, can be manufactured with greater accuracy than the entire sensor apparatus 30, or than the sensing channel 31 (for a given cost of manufacture). In other words, because the flow restrictor 46 can be manufactured with an accurately dimensioned inner diameter, the tolerances with which the other parts of the sensor apparatus 30 such as the sensing channel 31 are manufactured may be greater (compared with the situation if the flow restrictor were not present). The flow restrictor 46 may for example be manufactured from a material which has stable dimensions over a given range of temperatures (e.g., the temperature range which is expected during normal operation of the compressor). The flow restrictor 46 may for example be made using ceramic, aluminum or a suitable glass polymer.

The flow restrictor 46 may have any suitable cross-sectional shape. The flow restrictor 46 may, for example, have a circular cross-sectional shape or a rectangular cross-sectional shape. It may be easier to provide the sensing device 47 and the transistors 48, 49 in a flow restrictor with a rectangular cross-sectional shape.

The effect of the flow restrictor 46 may be expressed in terms of the airflow that would pass between the inlet chamber 35 and the outlet chamber 43 if there were no restriction between them. The flow restrictor may for example restrict this airflow to between around 50% and around 95% of the unrestricted airflow. The cross-sectional area of the flow restrictor 46 may be selected to provide a desired restriction of the airflow between the inlet and outlet chambers 35, 43. The cross-sectional area of the flow restrictor 46 may be selected based on a desired flow rate of air through the flow restrictor using the following equation:

$$Q = A^2 \sqrt{\frac{2(P1 - P2)}{\rho}}$$

where Q is the flow rate of air, A is the cross-sectional area of the flow restrictor, P1 and P2 are air pressures on either side of the flow restrictor, and ρ is the density of the air.

In a conventional compressor inlet operating in a conventional manner, a flow restrictor cross-sectional area of around 7 mm2 may for example provide a volume flow rate of air of around 5 ml/s. The cross-sectional area of around 7 mm2 could for example be provided by a circular flow restrictor with a diameter of around 3 mm, or could for example be provided by a rectangular flow restrictor with internal dimensions of around 1.5×5 mm. For a volume flow rate of air of around 10 ml/s the cross-sectional area of the flow restrictor may be scaled up accordingly, e.g. to around 14 mm2. The flow restrictor 46 may have any suitable cross-sectional area.

Although the sensing channel 31 has a particular length in FIGS. 3 and 4, the sensing channel may have any suitable length. Lengthening the sensing channel 31 will tend to straighten air which is travelling through the sensing channel, thereby reducing turbulence in the air. However, in embodiments in which the flow restrictor 46 is used, the flow rate through the flow restrictor may be sufficiently low that turbulence is not present to a significant degree. Where this is the case, a lengthened sensing channel 31 is not required, and the sensing channel may merely be long enough to accommodate the flow restrictor 46 and to connect the inlet and outlet chambers 35, 43.

An advantage of the sensor apparatus 30 is that, because it receives air from around the perimeter of the area 90 enclosed by the annular housing 29, the sensing device 47 measures a pressure which corresponds to the pressure which exists around the annular housing. In other words, the pressure is effectively sampled around the perimeter of the area 90 enclosed by the sensor apparatus 30. It is conventional to provide a pressure sensor on a rod which extends radially inwardly from a wall of a compressor inlet. When the pressure is sensed in this conventional manner only the pressure at one location in the compressor inlet is measured. The distribution of pressure within the compressor inlet may vary as the airflow into the inlet changes, for example with the distribution of peaks of pressure moving around the inlet as the airflow into the inlet increases or decreases. This may cause prior art pressure sensors to provide incorrect or inconsistent pressure measurements. This problem is avoided by the sensor apparatus 30 according to the embodiment of the invention because it samples air from around an area 90 enclosed by the sensor apparatus 30 in the compressor inlet 22a.

The cross-sectional area of the inlet chamber 35 may be sufficiently large that the pressure of air within the inlet chamber can equalize (or substantially equalize) around the inlet chamber. The cross-sectional area of the inlet chamber may for example be around 100 mm2 or more, and may for example be greater than around 300 mm2. The cross-sectional area of the inlet chamber 35 which will provide pressure equalization may depend upon the diameter of the inlet chamber. In an embodiment, the inlet chamber 35 may have an outer diameter of around 90 mm, for example with a cross-sectional area of around 100 mm2. The inlet chamber 35 may have any suitable outer diameter.

The pressure of air at the entrance 40 to the sensing channel 31 may be the equalized pressure of air around the inlet chamber 35. Therefore, a local increase of the pressure at an entrance 36 location which for example happens to be close to the entrance 40 of the sensing channel 31 will not give rise to a significant measurement error, because the local pressure increase will be distributed around the inlet chamber 35. The cross-sectional area of the outlet chamber 43 may be sufficiently large that air pressure can equalize (or substantially equalize) around the outlet chamber. This prevents pressure measurements from being influenced for example by pressure fluctuations which happen to occur adjacent to the outlet chamber 43 in the vicinity of the exit 42 of the sensing channel 31. The effect of such pressure fluctuations is equalized around the outlet chamber 43. In practice, pressure fluctuations may be smaller in the vicinity of the outlet chamber 43 than in the vicinity of the inlet chamber 35 (the pressure becomes more uniform as the air moves further into the compressor inlet).

The cross-sectional area of the outlet chamber may for example be around 100 mm2 or more, and may for example be greater than around 200 mm2. The cross-sectional area of the outlet chamber 43 which will provide pressure equalization may depend upon the diameter of the outlet chamber. In an embodiment, the outlet chamber 35 may have an outer diameter of around 70 mm, for example with a cross-sectional area of around 100 mm2. The outlet chamber 43 may have any suitable outer diameter.

The entrance 36 shown in FIGS. 2 and 3 is annular and extends around the entire inlet chamber 35. The entrance 36 may be considered to be a slit. However, the entrance to the inlet chamber may have any suitable form. For example the entrance may comprise a series of openings which are distributed around the circumference of the inlet chamber 35. The openings may for example be distributed with substantially equal separations (or may be distributed with different separations). A slit and a distributed series of openings may both be considered to be examples of an entrance which is distributed around the inlet chamber 35.

Similarly, the exit 44 shown in FIGS. 2 and 3 is annular and extends around the entire outlet chamber 43. The exit 44 may be considered to be a slit. However, the exit from the outlet chamber may have any suitable form. For example the exit may comprise a series of openings which are distributed around the circumference of the outlet chamber 43. The openings may for example be distributed with substantially equal separations (or may be distributed with different separations). A slit and a distributed series of openings may both be considered to be examples of an exit which is distributed around the annular housing.

Figure 5:
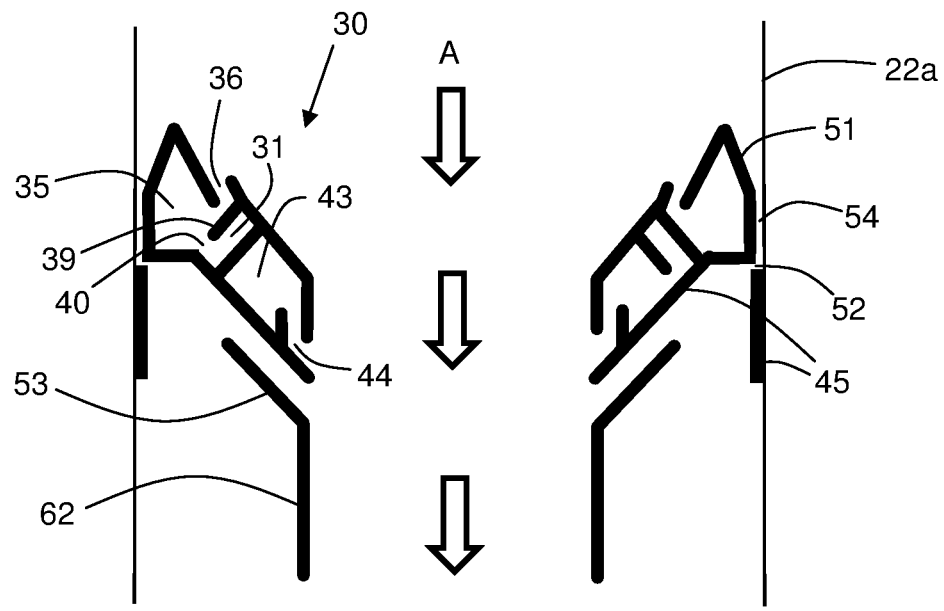
FIG. 5 schematically depicts the sensor apparatus in cross-section.

FIG. 5 shows schematically in transverse cross-section the sensor apparatus 30 secured by the annular bracket 45 to the compressor inlet wall 22a. The direction of flow of air A through the compressor inlet is indicated by arrows in FIG. 5. The sensor apparatus 30 corresponds with that shown in FIG. 2 but has a slightly modified shape. The inlet chamber 35 has a modified cross-sectional shape, and the annular housing of the sensor apparatus 30 has a more pronounced slope in the direction of flow of air A. Due to the slope of the annular housing, the entrance 36 of the inlet chamber 35 is upstream of the air flow A from the exit 44 of the outlet chamber 43. The sloping configuration of the annular housing of the sensor also directs airflow into the compressor.

Unlike in FIG. 2, the entrance 40 to the sensing channel 31 is shown, and consequently the inlet chamber 35 shown in FIG. 5 has a slightly different appearance from the inlet chamber shown in FIG. 2. A baffle 39 extends between the entrance 36 and the entrance 40 to the sensing channel 31. The baffle forces the air to change direction after passing through the entrance 36 and before entering the sensing channel 31, thereby preventing direct injection of air from the entrance 36 into the sensing channel entrance 40. The inlet chamber 31 is shaped such that there is no direct route from the entrance 36 to the sensing channel 31. The change of direction of the air in the inlet chamber 31 promotes equalization of pressure around the inlet chamber 35 (the air may be said to diffuse into the inlet chamber). At locations around the sensor apparatus 30 where the sensing channel entrance 40 is not provided, the baffle 39 is extended such that it forms a wall which extends fully across the inlet chamber 35 (as shown in FIG. 2). An outer perimeter of the sensor apparatus 30 is not pressed against the compressor inlet wall 22a, but instead a gap 54 exists between the sensor and the pressure inlet wall. The gap 54 may for example be 1-2 mm wide. One or more openings 52 are provided in the bracket 45. The openings 52 may also be 1-2 mm wide, and may be distributed around the bracket 45. The bracket 45 presses against the compressor inlet interior wall 22a. The gap 54 between the sensor apparatus 30 and the compressor inlet wall 22a, together with the openings 52, form a generally annular channel through which air may flow. A so-called boundary layer of air may exist at the wall 22a of the compressor inlet, the boundary layer having properties which are not representative of the main body of air passing through the compressor inlet. This boundary layer of air passes through the gap 54 and openings 52 and thus does not influence the pressure as measured by the sensor. This may be desirable because, as mentioned, the boundary layer may not be representative of the pressure of the general body of air passing through the compressor inlet. The sensor apparatus 30 includes a sloping portion 51 at an upstream end which slopes downstream and towards the compressor wall 22a. The sloping portion 51 acts to push the boundary layer away from the entrance 36 of the sensor, and thereby prevents the boundary layer from influencing the measured pressure (or reduces the extent to which the boundary layer may influence the measured pressure).

Also shown in FIG. 5 is a wall structure 62 (which may be referred to as a baffle) which may also be located in the compressor inlet. The sensor apparatus 30 may have an innermost diameter which is substantially equal to or greater than the inner diameter of the wall structure 62. This may ensure that air which passes through the area encircled by the sensor apparatus 30 is not then obstructed as it travels beyond the sensor.

The wall structure 62 may include a sloping portion 53 which is configured to direct boundary layer air that has passed through gaps 54, 52 such that it rejoins the main airflow of the compressor (i.e. the airflow indicated by arrows A). The wall structure 62 may provide a map width enhancement to a turbocharger (as is known from the prior art). The wall structure may reduce audible noise during operation of a turbocharger (as is known from the prior art).

The sensing channel 31 may include one or more components which are arranged to modify the flow of air within the sensing channel. For example, one or more air straighteners 55 (e.g. air straightening tubes) may be used to provide a non-turbulent flow of air in the sensing channel 31. An example of this is shown schematically in FIG. 6. The air straighteners 55 may for example comprise an array of substantially parallel tubes which are provided in the sensing channel 31. The air straighteners 55 may condition the flow of air into a constant stream, removing fluctuations from the air. This may be beneficial if the flow of air through the sensing channel 31 is sufficiently high that turbulence may be generated in the air. In an embodiment in which a flow restrictor is provided in the sensing channel 31, the flow of air may be sufficiently low that significant turbulence will not occur, in which case air straighteners 55 may be omitted.

Figure 7:
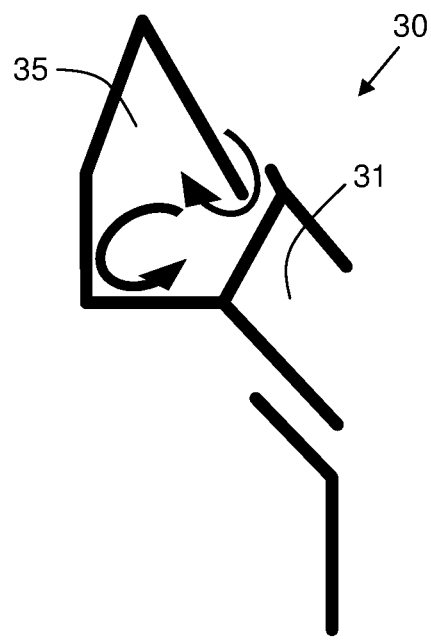
FIG. 7 schematically depicts in cross-section part of an inlet of the sensor apparatus.

FIG. 7 shows schematically in cross-section an inlet portion of the sensor apparatus 30. As is represented schematically by arrows, the annular inlet chamber 35 is shaped to induce a swirling action in air which enters the inlet chamber. This swirling action will tend to fling oil droplets and other contamination outwards towards surfaces of the inlet chamber 35. This reduces travel of oil droplets which are received on walls of the inlet chamber 35 to the sensing channel 31 and therefore will not contaminate the pressure sensing device in the sensing channel. One or more drains (not shown) may be provided in the inlet chamber 35 to allow oil to flow from the inlet chamber. The inlet chamber 35 has a relatively large surface area when viewed in cross-section. This may provide more opportunities for oil to come into contact with and adhere to a surface (compared with a relatively small surface area). The surface area of the inlet chamber 35 when viewed in cross-section is larger than for example would be the case if the inlet chamber were to be circular or rectangular in cross-section (for a given inlet chamber size).

Figure 8:
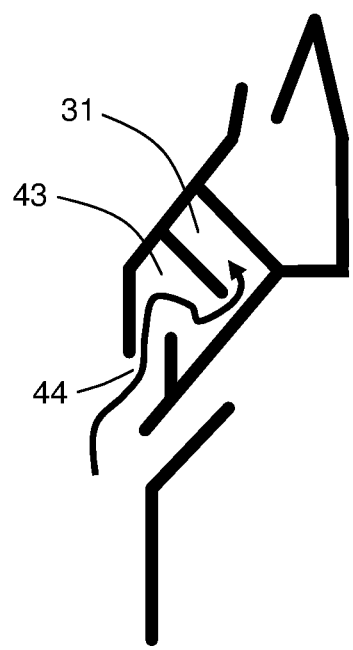
FIG. 8 schematically depicts in cross-section part of an outlet of the sensor apparatus.

In general operation of the compressor, air flow is as indicated by arrows A in FIG. 5. However, under engine braking there may be some flow of gas in the opposite direction, such that the pressure at the exit 44 of the sensor apparatus 30 is greater than the pressure at the entrance 36 of the sensor apparatus. Where this is the case, gas may flow into the exit 44 and thus into the outlet chamber 43. This gas may have travelled from an internal combustion engine and may thus carry a substantial amount of oil. It would therefore be disadvantageous for that oily gas to be incident upon the pressure sensing device since this would cause contamination build-up on the pressure sensing device. As shown schematically in FIG. 8, a relatively tortuous path must be followed by such back pressure oily gas in order to reach the sensing channel 31. Furthermore, the shape of the outlet chamber 43 induces swirling action in the gas in the outlet chamber. This swirling action will tend to fling oil droplets and other contamination outwards towards surfaces of the outlet chamber 43. The relatively tortuous path to the sensing channel and the swirling action of gas induced by the shape of the outlet chamber 43 both restrict the extent to which oily gas will reach the sensor 41, thereby limiting contamination of the sensor.

Figure 9:
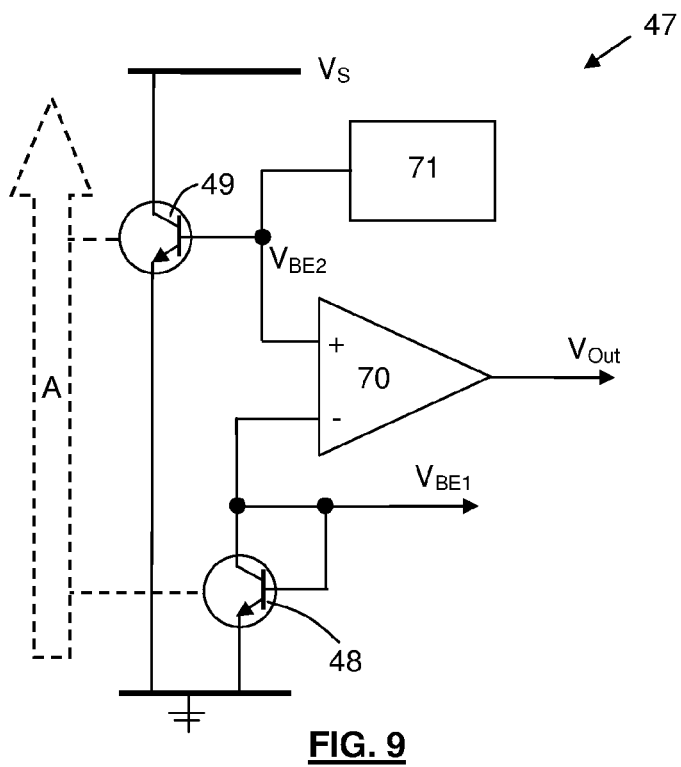
FIG. 9 is a schematic circuit diagram of a sensing device which forms part of an embodiment of the invention.

FIG. 9 shows schematically in more detail the sensing device 47 shown in FIG. 4. The sensing device 47 comprises first and second bipolar junction transistors 48, 49 which are arranged such that the temperature of the transistors is affected by air which flows through the flow restrictor 46 of the sensor 41 (see FIG. 4). The flow of air over the transistors 48, 49 is represented schematically in FIG. 9 by an arrow A. Although arrow A is shown to one side of the transistors 48, 49 and displaced away from one of the transistors 48, this is merely a consequence of the schematic nature of the figure. Dotted lines extending from the arrow A to the transistors 48, 49 are intended to indicate that the air is in thermal contact with the transistors. The transistors 48, 49 may be surface mount transistors. If the surface mount transistors include a thermal barrier, then the surface mount transistors may be mounted such that the thermal barrier is on an opposite side of the transistors from the airflow passing through the flow restrictor 46. The transistors 48, 49 may be arranged such that they lie flush (or substantially flush) with an inner surface of the flow restrictor 46. Alternatively, the transistors 48, 49 may be arranged such that they partially project from an inner surface of the flow restrictor 46. The partial projection may be sufficiently small that it does not induce a significant amount of turbulence into air flowing through the flow restrictor (i.e., turbulence which would have a significantly detrimental effect upon airflow measurements is not induced).

The sensing device 47 is a thermal flow meter that makes use of King's Law, which states that the heat energy removed from a hot body is proportional to the mass flow rate of air passing over the hot body. A comparison is made by the sensing device 47 between a hot body and an unheated body. In this case the hot body is a heated transistor (second transistor 49). A constant amount of power is delivered to the second transistor 49, thereby heating the second transistor to a temperature which is above the temperature of the first transistor 48 (the first transistor is not heated and is the unheated body). The difference in temperatures between the first and second transistors 48, 49 will depend upon the mass flow rate of the air flowing over the first and second transistors.

An operational amplifier 70 generates an output Vout which corresponds to the difference between the base emitter voltage (VBE1) of the first transistor 48 and the base emitter voltage (VBE2) of the second transistor 49. The base emitter voltage of a silicon bipolar transistor has a linear dependence upon the temperature of the transistor ($-1.79$ mV/° C.). Therefore, the output Vout of the operational amplifier 70 is directly proportional to the temperature difference between the first and second transistors 48, 49. The linear relationship between the base emitter voltage and temperature applies over the expected operational temperature range of the sensing device 47 (this may be from $-50°$ C. to $150°$ C.). Thus, the output Vout of the operational amplifier 70 may be used to determine the temperature difference between the first and second transistors 48, 49 over the expected operational temperature range of the sensing device 47.

A power control circuit 71 controls the delivery of power to the second (heated) transistor 49. The power delivered to the second transistor 49 may heat the second transistor such that, in the absence of airflow, the second transistor 49 is held at a temperature which is around 27° C. above the temperature of the first transistor 48. The thermal resistance between the junction of a silicon bipolar transistor and the case of the silicon bipolar transistor may for example be around 340° C. per watt. Thus, since the second transistor 49 is a silicon bipolar transistor, the temperature of the second transistor may be kept at around 27° C. above the temperature of the first transistor 48 by dissipating 80 mW in the second transistor (in the absence of cooling by an airflow).

When air is flowing over the transistors 48, 49, the cooling effect of the air on the second transistor will be significant (due to the elevated temperature of the second transistor). Consequently, a significant amount of heat will be lost from the second transistor 49. Since the power delivered to the second transistor 49 is not increased (it is maintained at 80 mW), the temperature difference between the first and second transistors is reduced. The output Vout of the operational amplifier 70 measures the reduced temperature difference. The output Vout of the operational amplifier 70 therefore provides a measurement of the mass flow rate of air over the first and second transistors 48, 49.

Since the temperature variation of the base emitter voltage of a silicon bipolar transistor is known and is linear, the base emitter voltage VBE1 of the first transistor 48 provides an indication of the temperature of the sensing device 47. When no air is flowing through the flow restrictor 46, the temperature measured using VBE1 will correspond to the ambient temperature of the sensor apparatus 30.

Figure 10:
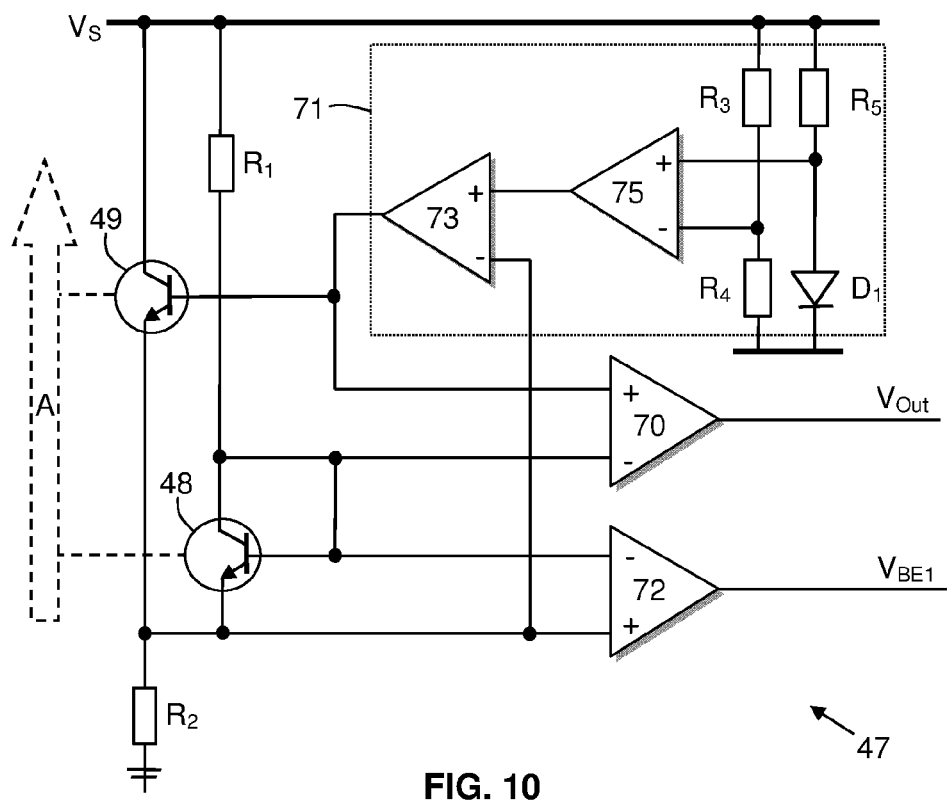
FIG. 10 is a schematic circuit diagram of the sensing device of FIG. 9 in greater detail.

The sensing device 47 is shown in more detail in FIG. 10. The first transistor 48 is connected via a resistor R1 to a voltage supply VS. The voltage supply VS may for example be a 5V supply, and the resistor R1 may for example have resistance of around 10KΩ. The emitter of the first transistor 48 is connected via a resistor R2 to ground. The resistor R2 may for example have a resistance of around 30Ω. The base and collector of the first transistor 48 are connected together. An operational amplifier 72 has an inverting input connected to the base and collector of the first transistor 48, and has a non-inverting input connected to the emitter of the transistor. The operational amplifier 72 thus provides an output which is indicative of the base emitter voltage VBE1 of the first transistor 48, and which is thus indicative of the temperature of the first transistor. Negligible power is dissipated through the first transistor 48, and the temperature of the first transistor thus corresponds with the general temperature of the sensing device 47. This depends upon the ambient temperature of the sensor apparatus 30 and the flow of air through the flow restrictor 46.

The second transistor 49 is connected between the voltage supply VS and the second resistor R2. The power control circuit 71 is indicated by a dotted line. The power control circuit 71 is configured to maintain the power delivered to the second transistor 49 at 80 mW. The power control circuit automatically reduces or increases the current supplied to the second transistor 49 to compensate for variation of the voltage across the second transistor. The power control circuit 71 comprises an operational amplifier 73 which has an output connected to the base of the second transistor 49. An inverting input of the operational amplifier 73 is connected to the emitter of the second transistor 49. The power control circuit 71 further comprises an operational amplifier 75 with an output which is connected to a non-inverting input of the operational amplifier 73. An inverting input of the operational amplifier 75 is connected between two resistors R3, R4. The resistor R3 may for example have a resistance of around 70kΩ and the resistor R4 may for example have a resistance of around 10Ω. A non-inverting input of the operational amplifier 75 is connected between a resistor R5 and a diode D1. The resistor R5 may for example have a resistance of 10kΩ. The power control circuit 71 may adjust the current delivered to the second transistor 49 between 15 mA and 22 mA to compensate for changes of the voltage across the second transistor, thereby maintaining the power delivered to the second transistor at 80 mW.

By delivering a constant amount of power to the second transistor 49, the power control circuit 71 ensures that the voltage Vout output of the operational amplifier 70 indicates the mass flow rate of air B which is flowing through the flow restrictor 46 (see FIG. 4). As mentioned further above, the output VBE1 of the operational amplifier indicates the temperature in the flow restrictor 46.

Due to manufacturing tolerances, the 27° C. offset between the temperatures of the first and second transistors 48, 49 which is referred to above may not be provided in every case by the 80 mW power delivered to the second transistor. Instead, there may be some variation between the temperature offsets of different sensing devices 47. A measurement of the temperatures of the first and second transistors 48, 49 may be performed when there is no air flowing through the sensing device 47. This measurement provides an accurate indication of the temperatures, irrespective of manufacturing tolerances, because the temperatures are governed by the −1.79 mV/° C. temperature dependence of the base emitter voltage silicon bipolar transistors (a material property which is unaffected by manufacturing tolerances). The measured temperature differential in the absence of airflow may be stored and used to calibrate subsequent airflow measurements. The calibration may for example be performed by a microprocessor or other control or monitoring apparatus. In the above description of the sensing device in connection with FIGS. 9 and 10, specific values of resistance, current, voltage and power are referred to. These values are merely examples, and other suitable values may be used. Similarly, although a particular circuit is shown in FIG. 10, other circuits may be used.

The sensing device 47 of FIGS. 9 and 10 is merely an example of a sensing device which may be used by embodiments of the invention. Other sensing devices may be used, for example in conjunction with a flow restrictor 46, or without a flow restrictor.

An alternative sensor may comprise a flow restrictor and two transistors, one of the transistors being heated to a temperature which is higher than the temperature of the other transistor (which may be unheated). This may be done for example by using a modified circuit to hold VBE2 at the second transistor 49 at a constant value (the constant value corresponding to a transistor temperature which is higher than the maximum expected air temperature). The base current drawn by the second (heated) transistor 49 will then provide an indication of the mass flow rate of air passing over the second transistor. The current will increase as the flow of air increases because more current will be needed to keep the second transistor at the constant temperature. In general, a temperature difference between transistors may be maintained during flow of air through the flow restrictor, the power required to maintain the temperature difference providing an indication of the mass flow rate of air passing over the transistors.

The transistors 48, 49 of the sensing device 47 are both provided within the flow restrictor 46 (e.g. as shown in FIG. 4) and both are arranged such that air flowing through the flow restrictor flows over them. In an alternative arrangement (not illustrated), a first transistor is provided within the flow restrictor 46 and a second transistor is provided outside of the flow restrictor. The second transistor may for example have a surface located in the inlet chamber 35 such that it provides a measurement of the air temperature in the inlet chamber. In this arrangement the sensing device may be considered to be partially within the sensing channel and partially outside of the sensing channel. Power may be provided to the first transistor in order to raise the temperature of the first transistor. The resulting temperature of the first transistor (as indicated by the base emitter voltage of that transistor) may be compared with the temperature of the second transistor (as indicated by the base emitter voltage of that transistor) in order to determine the mass flow rate of air through the flow restrictor. Where this arrangement is used, the first and second transistors may be substantially thermally isolated from each other, such that heat delivered to the second transistor does not cause significant heating of the first transistor (heat of the first transistor could reduce the accuracy of mass flow rate measurements). This may be done for example by separating the first transistor from a circuit board on which the second transistor is provided. Thermal insulation may be provided between the first transistor and the circuit board. Alternatively, the second transistor may be separated from the circuit board. Thermal insulation may be provided between the second transistor and the circuit board. In general, thermal insulation may be provided between the first and second transistors.

In an embodiment, the power provided to the first transistor may be adjusted in order to keep the first transistor at a constant elevated temperature. The power required to keep the transistor at the constant elevated temperature will provide a measurement of the mass flow rate of air through the flow restrictor.

An alternative sensor may measure mass flow rate by measuring transfer of heat between two devices. A heat source of the sensor may be a self-heating device such as a thermistor or any device that generates heat. A device such as a thermistor or metal which changes its resistivity according to temperature may be provided adjacent to the heat source. Airflow transports heat from the heater and warms the device, the extent to which the device is warmed being determined by the mass flow rate of the air. Devices may be provided either side of the heat source so that the mass flow rate of air in either direction can be measured (thereby allowing for example measurement of back pressure).

The above-described sensors include a flow restrictor which is manufactured separately from the sensing channel. The flow restrictor may for example be manufactured from a material which differs from the material used to make the sensing channel and other parts of the sensor apparatus (and may be made with more accurately controlled dimensions). In an alternative approach, a separately fabricated flow restrictor may be omitted, with the sensing channel itself being provided with a narrow diameter such that it acts to restrict airflow. Where this approach is used, the dimensions of the sensing channel should be accurately controlled. This may be more difficult to achieve than accurate control of dimensions of a separately fabricated flow restrictor. When the flow restrictor is omitted the sensing device 47 may be provided on an inner wall of the sensing channel.

Figure 11:
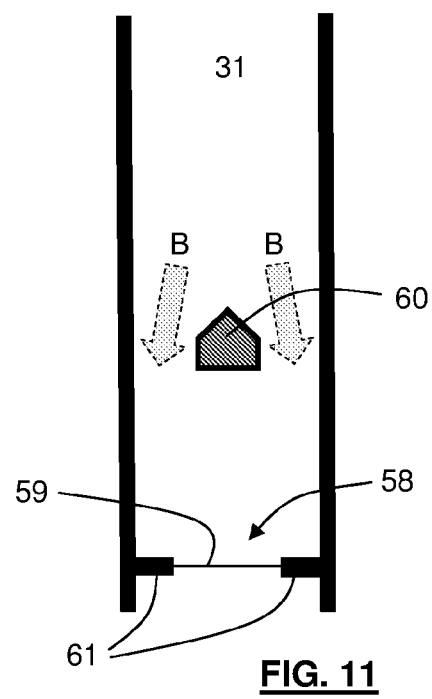
FIG. 11 schematically depicts a sensor of the sensor apparatus according to an alternative embodiment of the invention.

FIG. 11 shows an alternative sensor in the sensing channel. The alternative sensor comprises a hot wire mass flow rate sensor 58. The hot wire mass flow rate sensor 58 comprises a wire 59 which extends across the sensing channel 31. A current is passed through the wire 59, thereby heating the wire. The wire is cooled by the flow of air over the wire 59. The resistance of the wire, which is linked to the temperature of the wire, therefore provides an indication of the mass flow of air through the sensing channel.

A vortex generating device 60 may be provided in the sensing channel 31, as shown schematically in FIG. 7. The vortex generating device 60 may for example have a conical upstream surface which includes a helix or generally helical structure and which is arranged to induce a vortex in air flowing through the sensing channel 31. The vortex will tend to push oil droplets or other contaminants away from a central axis of the sensing channel 31, as is represented schematically by dotted arrows B. The vortex generating device 60 may be located axially centrally within the sensing channel 31. The wire 59 may intersect a central axis of the sensing channel 31. Radially outer ends of the wire 59 may be covered with an insulating material 61, the insulating material being arranged such that the flow of air over the insulating material does not significantly affect the temperature of the wire. Since the vortex tends to push oil droplets or other contaminants away from the central axis of the sensing channel 31, the oil droplets or other contaminants are directed away from a sensing portion of the wire 59, and instead bypass the wire or are incident upon the insulating material 61. The effect of oil droplets and other contaminants on the mass flow rate sensed by the wire 59 is thereby reduced.

The vortex generating device 60 may be used in conjunction with other forms of sensor.

In a further alternative approach a Karman vortex sensor may be used as the sensor. The Karman vortex sensor works by disrupting a laminar airflow using a bow which extends across the airflow. A resulting wake in the airflow consists of an oscillatory pattern of Karman vortices. The frequency of the pattern is proportional to the air velocity and the amplitude of the pattern is proportional to the density of the airstream. The oscillatory pattern of Karman vortices may for example be measured using a pressure detector.

In a further alternative approach an ionising Karman vortex sensor may be used as the sensor. The ionising Karman vortex sensor corresponds with a conventional Karman vortex sensor except that a voltage is applied to the bow which extends across the airflow, the bow thus causing ionization of the air which passes over it. Since the air is ionized the oscillatory pattern of Karman vortices can be detected using electrodes located downstream of the bow. Referring to FIG. 11, the vortex generating device 60 may be replaced with a bow to which a voltage is applied, and the wire 59 may be replaced with electrodes (e.g. an electrode being provided on either side of the sensing channel 31). An output signal from the electrodes will provide a measurement of the oscillatory pattern of Karman vortices, thereby allowing the mass flow rate of air in the sensing channel 31 to be determined.

In a further alternative approach, the sensor 41 may be a strain gauge pressure sensor (e.g. a piezoresistive strain gauge). The piezoresistive strain gauge may for example be provided in the sensing channel 31, blocking the sensing channel such that pressure on one side of the strain gauge corresponds with (or is related to) the pressure in the inlet chamber 35 and pressure on the opposite side of the strain gauge corresponds with (or is related to) pressure in the outlet chamber 43. Other suitable pressure sensors which block the sensing channel 31 may be used. Where this approach is used there is no flow of air through the sensing channel. The chamber 35 may thus be referred to as the first chamber rather than the inlet chamber, and the chamber 43 may thus be referred to as the second chamber rather than the outlet chamber. The strain gauge could be placed in an opening between the first chamber 35 and the second chamber 43 (i.e. such that the strain gauge closes the opening), with the sensing channel 31 being omitted.

In a further alternative approach, there may be no connection between the first and second chambers 35, 43. A pressure sensor may be used to measure the pressure in the first chamber, and a pressure sensor may be used to measure the pressure in the second chamber. The difference between these measurements will correspond with the pressure difference between the first and second chambers, thereby allowing the mass flow rate of air flowing through the compressor inlet to be determined.

Figure 12:
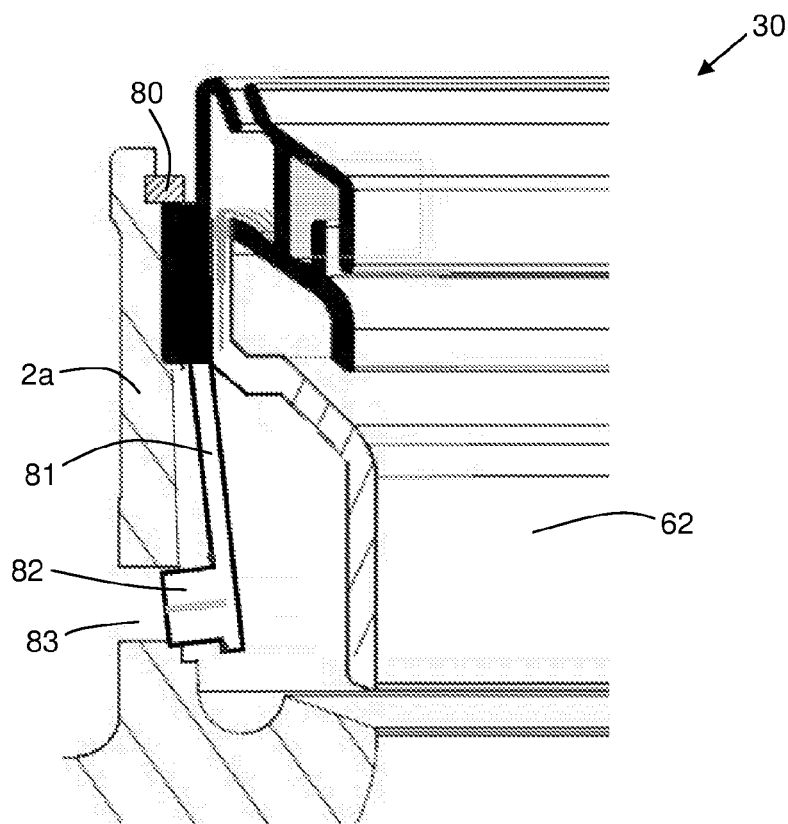
FIG. 12 schematically depicts part of the sensor apparatus in partial cross-section.

FIG. 12 shows the sensor apparatus 30 in partial cross-section, together with part of the compressor housing 2a. Also shown in FIG. 12 is part of the wall structure 62 which is located in the compressor inlet. The wall structure 62 may for example be formed from plastic. The sensor apparatus 30 may be formed from plastic. The sensor apparatus 30 and the wall structure 62 may be fixed together.

As shown in FIG. 12, the sensor apparatus 30 and wall structure 62 are inserted into the compressor inlet. A circlip 80 (or other securing device) holds the sensor apparatus 30 and wall structure 62 in place in the compressor inlet. The sensor apparatus 30 includes an arm 81 which extends from the generally annular part of the sensor apparatus. The arm 81 has some flexibility (or is hinged) such that an end of the arm which is distal from a main portion of the sensor apparatus may be moved radially inward (as shown). A socket 82 projects radially outwardly from the arm 81. A hole 83 is provided in the compressor housing 2a, the hole having a shape which corresponds with the exterior perimeter of the socket 82. To fit the sensor apparatus 30, the sensor apparatus 30 and wall structure 62 may be inserted into the compressor inlet, following which the socket 82 may be drawn into the hole 83. The socket 82 and hole 83 may help to position the sensor apparatus 30 and wall structure 62 correctly in the compressor inlet, and may help to retain the sensor apparatus and wall structure in the compressor inlet.

Wires (or other electrical connectors) extend within the arm 81 and to the socket 82. The wires are connected to the sensor 41 (described further above). A plug (not shown) may be plugged into the socket 82 thereby providing electrical connection to the sensor 41 (see FIG. 4). Output signals may thus be taken from the sensor 41, and for example passed to a microprocessor or other control or monitoring apparatus. The socket 82 may also be used to deliver power to the sensor 41.

The arm 81 and socket 82 are merely examples of one way in which the electrical connection may be made to the sensor. Other ways of electrically connecting to the sensor will be apparent to those skilled in the art. As will be appreciated from FIG. 12, the sensor apparatus 30 may be easily and conveniently fitted to a compressor inlet. Similarly, the sensor apparatus may be easily and conveniently removed from the compressor inlet (e.g. to allow repair or replacement of the sensor apparatus).

As described further above, FIG. 2 shows an entrance 36 to the inlet chamber 35, the entrance being annular and extending around the inlet chamber 35. The entrance 36 may extend with a uniform width around the inlet chamber 35. Alternatively, the width of the entrance 36 may be non-uniform around the inlet chamber. For example, the width of the entrance 36 may vary as a function of circumferential position around the inlet chamber 35.

Figure 13:
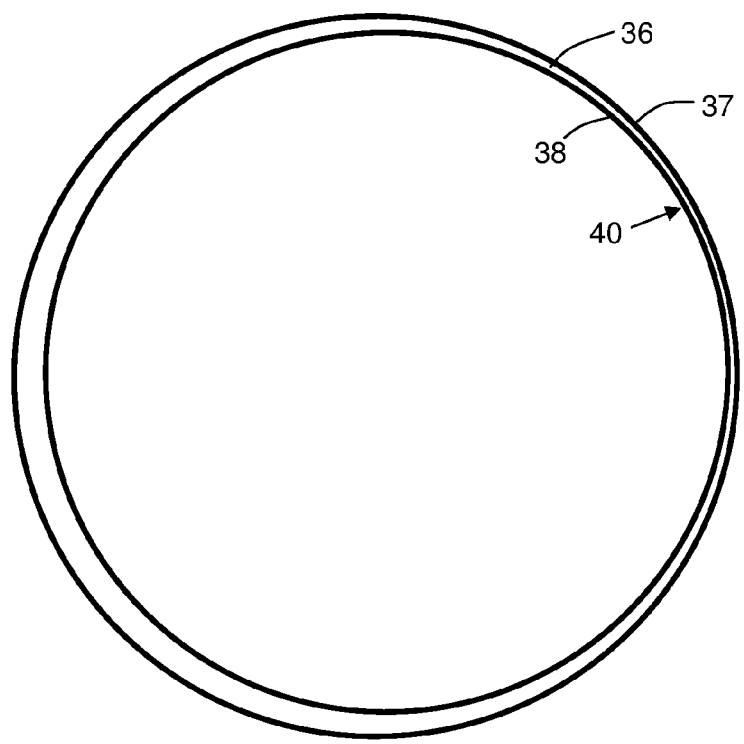
FIG. 13 schematically depicts an entrance of the sensor apparatus according to an embodiment of the invention.

FIG. 13 shows schematically the entrance 36 defined by outer 37 and inner 38 entrance walls. Other parts of the sensor apparatus are omitted in order to avoid complicating the figure. However, the location of the entrance to the sensing channel from the inlet chamber is indicated by an arrow 40. As may be seen from FIG. 13, the entrance 36 varies in width, having a minimum width in the vicinity of the sensing channel entrance 40. The width of the entrance 36 increases as the circumferential distance from the sensing channel entrance 40 increases. In an embodiment, the width of the entrance 36 may continue to increase with circumferential distance from the sensing channel entrance 40, such that the entrance has a maximum width on an opposite side of the inlet chamber from the sensing channel entrance. Alternatively, the width of the entrance 36 may increase to a maximum width at a given circumferential distance from the sensing channel entrance 40 (e.g. 90° from the entrance), with the remainder of the entrance having the maximum width. In general, the entrance 36 may be narrower in the vicinity of the sensing channel entrance 40 and wider further away from the sensing channel entrance. In this context the terms "narrower" and "wider" are not intended to imply particular absolute sizes, merely to indicate a relative difference in size. Because the entrance 36 to the inlet chamber is narrower in the vicinity of the entrance 40 to the sensing channel, the flow of air into the inlet chamber is reduced in the vicinity of the sensing channel entrance. This reduces the extent to which pressure in the compressor inlet 2a in the vicinity of the sensing channel entrance 40 affects measurements obtained using the sensor apparatus 30. If perfect equalization of pressure in the inlet chamber occurs then this reduction effect provides no benefit (in which case a uniform inlet chamber entrance 36 may be used). If equalization of pressure in the inlet chamber is not perfect then this reduction effect may improve the accuracy of measurements obtained using the sensor apparatus 30, by preventing or reducing compressor inlet pressure in the vicinity of the sensing channel entrance 40 from disproportionately affecting the measured pressure. Imperfect equalization of pressure may for example occur if flow through the sensing channel 31 (see FIG. 3) is not small enough to amortize any differences in pressure in the inlet chamber 35. This could occur for example if the flow restrictor 46 allows a substantial flow of gas (or if a flow restrictor is not present).

Figure 14:
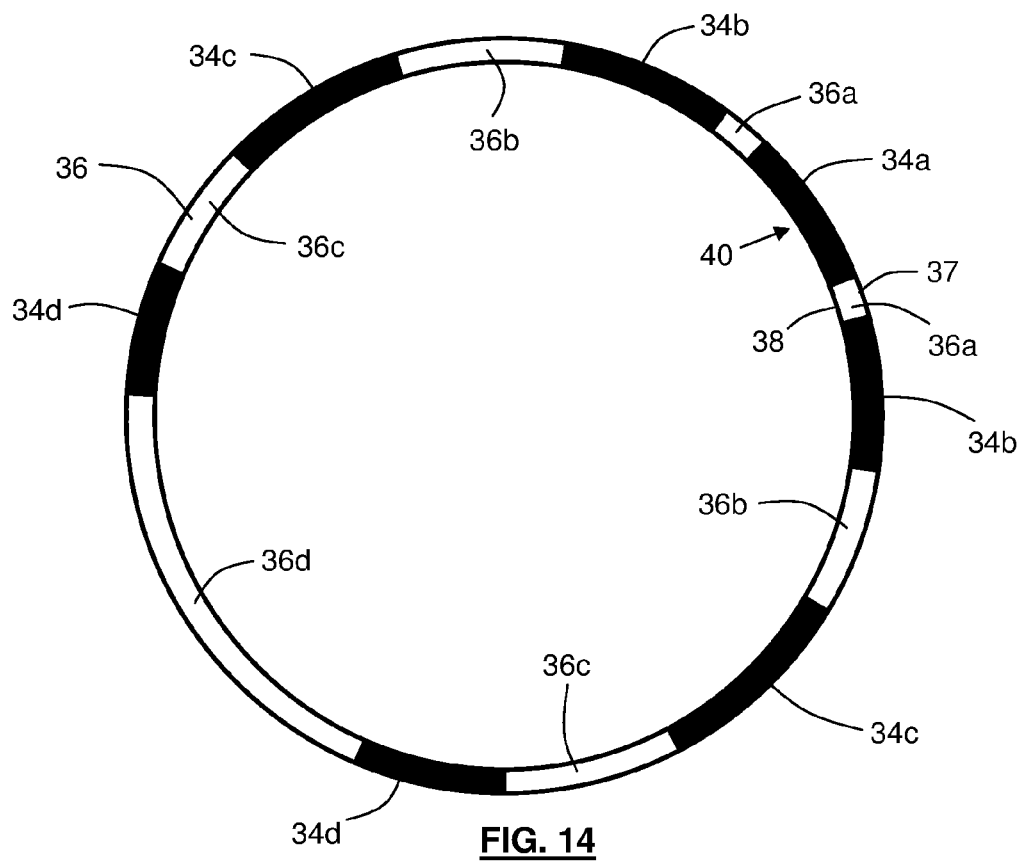
FIG. 14 schematically depicts an entrance of the sensor apparatus according to an alternative embodiment of the invention.

In an alternative approach, schematically pictured in FIG. 14, the entrance 36 to the inlet chamber has a uniform width around the inlet chamber (see FIG. 3), but portions of the entrance are closed. Closed portions 34a-d of the inlet chamber entrance 36 are shaded black in FIG. 14 and open portions 36a-d of the entrance are white. As may be seen, a closed entrance portion 34a is provided in the immediate vicinity of the sensing channel entrance 40. Open portions 36a are provided either side of the closed portion 34a. Additional closed portions 34b are provided at outer ends of the open portions 36a, followed by additional open portions 36b. Additional closed portions 34c, open portions 36c and closed portions 34d follow. Finally, an open portion 36d is provided on an opposite side of the inlet chamber from the sensing channel entrance 40. The length of the open portions 36a-d increases with circumferential distance from the sensing channel entrance 40. Thus, the open portions 36a-d of the entrance 36 occupy a smaller proportion of the entrance 36 in the vicinity of the sensing channel entrance 40 than on an opposite side of the first chamber from the sensing channel entrance. This reduces the flow of air into the inlet chamber 35 in the vicinity of the sensing channel entrance 40. The flow of air into the inlet chamber 35 increases as circumferential distance from the sensing channel entrance 40 increases. This reduces the extent to which pressure in the compressor inlet 2a in the vicinity of the sensing channel entrance 40 affects measurements obtained using the sensor apparatus 30. As explained above, this may be beneficial if equalization of pressure in the inlet chamber 35 is not perfect.

The arrangement shown in FIG. 14 may be considered to be an example of the entrance 36 extending intermittently around the inlet chamber. It may be considered to be an example of the entrance 36 being distributed around the inlet chamber.

Although FIGS. 13 and 14 and the above description relate to the inlet chamber entrance, the illustrated and described features may also be applied to the exit 44 of the outlet chamber 43 (see FIGS. 2 and 3).

Embodiments of the invention sample a fraction of the air passing through the compressor inlet, and generate an air mass flow rate measurement using that sampled fraction. Compared with a conventional air mass flow rate sensor apparatus which extends across the compressor inlet and receives the full force of air flowing through the inlet, the embodiments described herein may reduce the likelihood of damage or contamination.

In the above description, where a component is described as being annular this may be interpreted as meaning that the component has a generally annular shape, and encompasses for example a discontinuous annular shape. For example, the annular entrance 36 may be discontinuous. The annular entrance 36 could for example include structural elements which are distributed around the entrance and which block the entrance at those distributed locations.

In the above description, the term "circumference" may be interpreted as referring to a path which extends around an annular component at any radial position (i.e. it is not limited to the outer perimeter of the annular component).

Although the above description refers to air passing into the compressor inlet, other gases may pass into the compressor inlet. For example, recirculated exhaust gas may pass into the compressor inlet.

Embodiments of the invention may provide measurements of the mass flow rate of gas out of the compressor inlet (i.e. flow of gas in the opposite direction to the direction indicated in FIG. 5).

Although the above description describes the sensor apparatus in the context of a compressor inlet, the sensor apparatus may be provided at any suitable location. For example, the sensor apparatus may be provided at some other location in an internal combustion engine or may be connected to an internal combustion engine.

Although the sensor apparatus described above has a generally annular shape, the sensor apparatus may have any suitable shape. For example, the sensor apparatus may be oval, or may be substantially rectangular (e.g. with rounded corners to promote pressure equalization through corners of chambers of the sensor apparatus). Embodiments of the invention may include a first chamber which receives gas from an entrance distributed around the first chamber. The first chamber may be shaped to allow substantial equalization of pressure within the first chamber. Embodiments of the invention may include a second chamber which receives gas from an entrance distributed around the second chamber. The second chamber may be shaped to allow substantial equalization of pressure within the second chamber. The first chamber may be upstream of the second chamber in use. The first and second chambers may be connected by a sensing channel.

Modifications to the structure of the illustrated embodiments of the invention will or may be readily apparent to the appropriately skilled person after assessment of the provided description, claims and Figures, especially in the context of the field of the invention as a whole. Thus, it should be understood that various modifications may be made to the embodiments of the invention described above, without departing from the present invention as defined by the claims that follow.

The invention claimed is:

1. A sensor apparatus comprising:
a housing having an inner perimeter which defines an area through which gas may flow, the housing being provided with a first chamber which extends around the area through which gas may flow, an entrance being distributed around the first chamber; a second chamber which extends around the area through which gas may flow, and an exit being distributed around the second chamber, the first chamber being arranged to be upstream of the second chamber in use;
a sensing channel connected between the first chamber and the second chamber such that gas flows through the sensing channel in use;
and one-or more sensors arranged to measure a pressure difference between pressure in the first chamber and pressure in the second chamber.

2. The sensor apparatus of claim 1 wherein the first chamber has a cross-sectional area which is sufficiently large that in use the pressure of gas within the first chamber substantially equalizes during operation of the sensor.

3. The sensor apparatus of claim 1, wherein the second chamber has a cross-sectional area which is sufficiently large that in use the pressure of gas within the second chamber substantially equalizes during operation of the sensor.

4. The sensor apparatus of claim 1 wherein the one or more sensors are located in the sensing channel.

5. The apparatus of claim 4, wherein the first chamber is shaped such that there is no direct flow path between the entrance of the first chamber and the sensing channel.

6. The sensor apparatus of claim 4, wherein the entrance to the first chamber is narrower in a vicinity of the sensor than further away from an entrance of the sensing channel.

7. The sensor apparatus of claim 4, wherein the entrance extends intermittently around the first chamber, and wherein open portions of the entrance occupy a smaller proportion of the entrance in a vicinity of an entrance of the sensing channel than open portions of the entrance further away from the entrance of the sensing channel.

8. The sensor apparatus of claim 4, wherein the exit from the second chamber is narrower in a vicinity of an exit of the sensing channel than further away from an exit of the sensing channel.

9. The sensor apparatus of claim 4, wherein the exit extends intermittently around the second chamber, and wherein open portions of the exit occupy a smaller proportion of the exit in a vicinity of an exit of the sensing channel than open portions of the exit further away from the exit of the sensing channel.

10. The sensor apparatus of claim 4, wherein the one or more sensors comprises a sensing device which is at least partially located within the sensing channel.

11. The sensor apparatus of claim 10, wherein the sensing device is at least partially located within a flow restrictor which is provided in the sensing channel.

12. The sensor apparatus of claim 10, wherein the sensing device comprises two bipolar transistors, one of the bipolar transistors being electrically heated.

13. The sensor apparatus of claim 12, wherein the sensing device further comprises a circuit configured to provide substantially constant power to the heated bipolar transistor and to measure a difference between base emitter voltages of the bipolar transistors.

14. The sensor apparatus of claim 12, wherein the sensing device further comprises a circuit configured to maintain a substantially constant temperature difference between the bipolar transistors, and to measure the power used to heat the heated transistor.

15. The sensor apparatus of claim 13, wherein the circuit is further configured to measure the temperature of the other of the two bipolar transistors which is not electrically heated.

16. The sensor apparatus of claim 14, wherein the bipolar transistor which is not electrically heated is located within the flow restrictor.

17. The sensor apparatus of claim 11, wherein the flow restrictor is not formed integrally with other parts of the sensing apparatus.

18. The sensor apparatus of any of claim 11, wherein the flow restrictor is formed from a material which is different than the material used to form the housing of the sensor apparatus.

19. The sensor apparatus of claim 1, wherein the one or more sensors comprises a strain gauge which is connected between the first chamber and the second chamber.

20. The sensor apparatus of claim 19, wherein the strain gauge is provided in a sensing channel which is connected between the first chamber and the second chamber.

21. The sensor apparatus of claim 1, further comprising an additional chamber located between the first and second chambers, the additional chamber being connected to the first chamber or the second chamber, wherein an additional sensor is located within the additional chamber.

22. The sensor apparatus of claim 1, wherein a bracket extends from the sensor apparatus, the bracket having openings through which gas may flow.

23. The sensor apparatus of claim 1, wherein the sensor apparatus includes a sloping portion configured to push boundary layer gas away from the entrance of the first chamber.

24. A turbocharger comprising:
a turbine connected via a shaft to a compressor having an inlet; and
a sensor apparatus provided at the inlet of the compressor, the sensor apparatus comprising:
a housing having an inner perimeter which defines an area through which gas may flow, the housing being provided with a first chamber which extends around the area through which gas may flow, an entrance being distributed around the first chamber; a second chamber which extends around the area through which gas may flow, and an exit being distributed around the second chamber, the first chamber being arranged to be upstream of the second chamber in use, wherein the housing is configured to allow gas to flow from the first chamber through the second chamber to the area; and
one or more sensors arranged to measure a pressure difference between pressure in the first chamber and pressure in the second chamber.

25. The turbocharger of claim 24, wherein a gap is provided between the sensor apparatus and a wall of the inlet of the compressor.

26. A method of measuring the mass flow rate of a gas using a. sensor apparatus comprising a housing having an inner perimeter which defines an area through which the gas may flow, the method comprising:
receiving gas in a first chamber which extends around the area through which gas may flow, an entrance being distributed around the first chamber;
receiving the gas in a sensing channel connected between the first chamber and a second chamber such that gas flows through the sensing channel in use;
receiving downstream gas in the second chamber which extends around the area through which gas may flow, an exit being distributed around the second chamber; and
using one or more sensors to measure a pressure difference between pressure in the first chamber and pressure in the second chamber.

27. The method of claim 26, wherein a boundary layer of gas passes around an outer perimeter of the housing and thereby bypasses the entrance of the first chamber.

28. The method of claim 26, wherein the gas is flowing into a compressor of a turbocharger.

* * * * *